US011895332B2

(12) United States Patent
Gondo et al.

(10) Patent No.: US 11,895,332 B2
(45) Date of Patent: Feb. 6, 2024

(54) SERVER DEVICE, COMMUNICATION SYSTEM, AND COMPUTER-READABLE MEDIUM

(71) Applicant: KABUSHIKI KAISHA TOSHIBA, Tokyo (JP)

(72) Inventors: Shunichi Gondo, Tokyo (JP); Takumi Kurosaka, Kawasaki Kanagawa (JP); Mika Minematsu, Tokyo (JP); Tomonori Maegawa, Tokyo (JP); Yu Mizoguchi, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/185,864

(22) Filed: Feb. 25, 2021

(65) Prior Publication Data
US 2021/0329295 A1    Oct. 21, 2021

(30) Foreign Application Priority Data

Apr. 21, 2020  (JP) ................................ 2020-075376

(51) Int. Cl.
*H04N 19/593* (2014.01)
*H04L 65/70* (2022.01)

(52) U.S. Cl.
CPC ........... *H04N 19/593* (2014.11); *H04L 65/70* (2022.05)

(58) Field of Classification Search
CPC ............................ H04N 19/593; H04L 65/607
See application file for complete search history.

(56) References Cited

U.S. PATENT DOCUMENTS

| 2005/0071491 | A1  |  3/2005 | Seo |
| 2010/0185748 | A1* |  7/2010 | Ishii ............... H04N 21/234318 709/219 |
| 2010/0325656 | A1* | 12/2010 | Hardacker ....... H04N 21/47202 725/31 |
| 2011/0153782 | A1* |  6/2011 | Zhao .................. H04N 21/4402 709/219 |
| 2012/0030723 | A1  |  2/2012 | Baum et al. |

(Continued)

FOREIGN PATENT DOCUMENTS

| EP | 3 454 566 A1 | 3/2019 |
| JP | 2004-110244 A | 4/2005 |

(Continued)

OTHER PUBLICATIONS

R. Pantos et al., "HTTP Live Streaming." IETF RFC 8216, 60 pages (2017).

*Primary Examiner* — Richard T Torrente
(74) *Attorney, Agent, or Firm* — Finnegan, Henderson, Farabow, Garrett & Dunner, LLP

(57) ABSTRACT

A server device includes one or more processors. The processors receive a plurality of transmission data from a transmitting device. The processors divide the plurality of transmission data into first data and second data. The processors transmit the first data to an external server device that delivers transmission data to a receiving device. The processors store the second data in a storage. The processors receive a transmission request for the second data from the receiving device or the external server device. The processors transmit the second data to the external server device in response to the transmission request.

12 Claims, 17 Drawing Sheets

(56) References Cited

U.S. PATENT DOCUMENTS

| | | | |
|---|---|---|---|
| 2013/0273945 A1* | 10/2013 | Deshpande | H04N 19/433 |
| | | | 455/466 |
| 2014/0143439 A1 | 5/2014 | Ramamurthy | |
| 2016/0088294 A1 | 3/2016 | Gondo et al. | |
| 2019/0104326 A1* | 4/2019 | Stockhammer | H04N 21/816 |
| 2019/0158551 A1 | 5/2019 | Kurosaka et al. | |
| 2020/0137354 A1* | 4/2020 | Nathan | G06V 20/52 |
| 2020/0145685 A1 | 5/2020 | Gondo et al. | |
| 2020/0204841 A1* | 6/2020 | Van Brandenburg | |
| | | | H04N 21/85406 |

FOREIGN PATENT DOCUMENTS

| | | |
|---|---|---|
| JP | 2005-110244 A | 4/2005 |
| JP | 6239472 B2 | 11/2017 |
| JP | 2019-92133 A | 6/2019 |
| JP | 2020-72461 A | 5/2020 |
| KR | 10-2011-0051336 A | 5/2011 |

\* cited by examiner

SERVER DEVICE, COMMUNICATION SYSTEM, AND COMPUTER-READABLE MEDIUM

CROSS-REFERENCE TO RELATED APPLICATIONS

This application is based upon and claims the benefit of priority from Japanese Patent Application No. 2020-075376, filed on Apr. 21, 2020; the entire contents of which are incorporated herein by reference.

FIELD

Embodiments described herein relate generally to a server device, a communication system, and a computer program product.

BACKGROUND

Adaptive streaming such as HTTP Live Streaming (HLS) and Moving Picture Experts Group-Dynamic Adaptive Streaming over HTTP (MPEG-DASH) can be applied to, for example, a system (a video delivery system and a video monitoring system) that delivers and monitors video (moving image data) captured by a camera.

DETAILED DESCRIPTION

According to an embodiment, a server device includes one or more processors. The processors receive a plurality of transmission data from a transmitting device. The processors divide the plurality of transmission data into first data and second data. The processors transmit the first data to an external server device that delivers transmission data to a receiving device. The processors store the second data in a storage. The processors receive a transmission request for the second data from the receiving device or the external server device. The processors transmit the second data to the external server device in response to the transmission request.

A preferred embodiment of a transmitting device according to the present invention will be described in detail below with reference to the accompanying drawings.

In a conventional video delivery system using adaptive streaming, there is a need to prepare a network line with a high transmission rate in order to reliably record a high-quality video stream (an example of transmission data) required for high-quality live video delivery.

On the other hand, in a large-scale video delivery system in which a large number of cameras are connected, a large amount of camera video is always transmitted. Therefore, in order to reduce a line load or cost, it is desirable to use a network line having a low transmission rate between the camera and a server device for recording video. However, on a line with a low transmission rate, a quality of live video will be low, which may interfere with monitoring work.

Therefore, in the present embodiment, a video delivery system capable of reducing a line load or a processing load without deteriorating a quality is realized.

Here, an example of transmission data to which the present embodiment can be applied will be described. The transmission data includes time series data in which a time order is defined, such as moving image data and sensor data.

The moving image data is, for example, data captured by an imaging device such as a camera and a frame capture. The moving image data is acquired in real time from, for example, the imaging device, and is used as content to be delivered. The moving image data once stored in a storage medium after being captured may be used as the content to be delivered.

The sensor data is data indicating a value detected by a sensor (detection device), and includes, for example, information on the time when the data is detected (sampled). The sensor may be any device. For example, a microphone that acquires voice, a Global Positioning System (GPS) device that acquires location information, and a sensor that periodically or irregularly detects a surrounding environment to be detected, the temperature, speed, pressure, and the like of an electronic device and outputs it as sensor data can be used.

In the following, an example in which the moving image data is mainly used as transmission data will be described.

Figure 1:
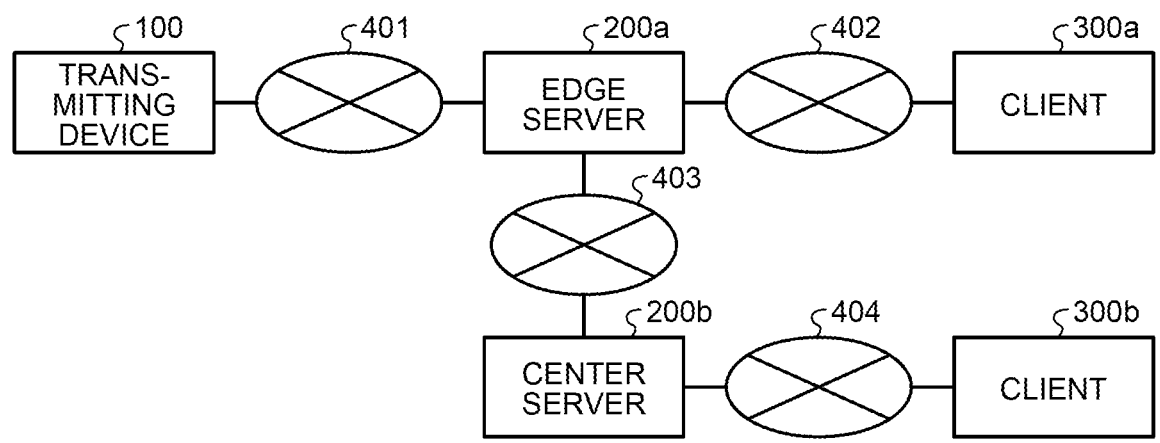
FIG. 1 is a block diagram of a video delivery system according to the present embodiment.

FIG. 1 is a block diagram illustrating an example of a configuration of the video delivery system according to the present embodiment. As illustrated in FIG. 1, the video delivery system includes a transmitting device 100 (an example of a transmitting device), an edge server 200a (an example of a server device and a second server device), a center server 200b (an example of an external server device and a first server device), and clients 300a and 300b (an example of a receiving device). The transmitting device 100 and the edge server 200a are connected by a network 401. The edge server 200a and the client 300a are connected by a network 402. The edge server 200a and the center server 200b are connected by a network 403. The center server 200b and the client 300b are connected by a network 404.

The edge server 200a corresponds to a server arranged at a position physically close to or logically close to a terminal (transmitting device 100). The center server 200b corresponds to a server higher than the edge server 200a, and is, for example, a device that collects and processes data from the edge server 200a.

The networks 401 to 404 may be any network such as the Internet. For example, the networks 401 to 404 may be either a wired network or a wireless network. In addition, some or all of the networks 401 to 404 may be configured as one integrated network.

A configuration of the communication system illustrated in FIG. 1 is an example, and is not limited to thereto. For example, a plurality of transmitting devices 100, edge servers 200a, center servers 200b, and clients 300a and 300b may be provided. For example, the plurality of edge servers 200a are delivered and arranged at positions physically close to the transmitting device 100, and one or more center servers 200b may be configured to collect data from the plurality of delivered and arranged edge servers 200a. In addition, each of the transmitting device 100, the edge server 200a, the center server 200b, and the clients 300a and 300b may be physically configured by one device, or may be physically configured by a plurality of devices. For example, the center server 200b may be built on a cloud environment. For example, the edge server 200a may be centralized in a central base such as a telecommunications carrier, or may be delivered in a regional base and an end user's facility.

In addition, the clients 300a and 300b may be connected to both the edge server 200a and the center server 200b. The video delivery system may not include the client 300a but may include only the client 300b connected to the center server 200b. When it is not necessary to distinguish between the clients 300a and 300b, it is simply called a client 300.

Figure 2:
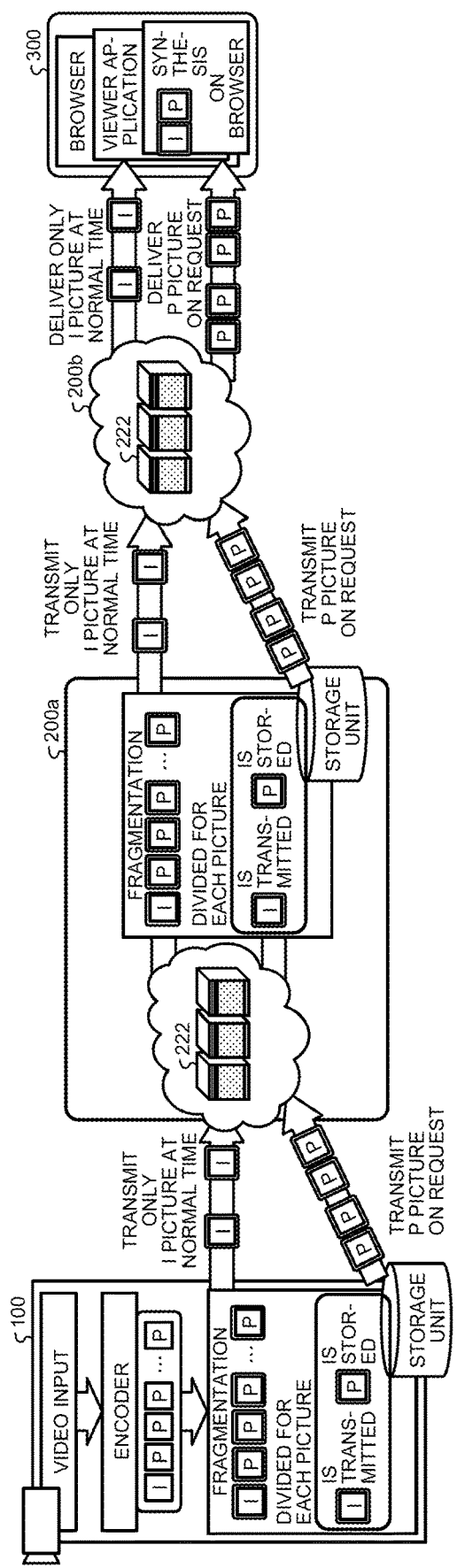
FIG. 2 is a diagram illustrating an outline of delivery processing by the video delivery system of the present embodiment.

FIG. 2 is a diagram illustrating an outline of delivery processing by the video delivery system of the present embodiment. The transmitting device 100 inputs a video and encodes (codes) the input video. The transmitting device 100 compresses and encodes the video according to a standard such as H.264. The encoded video includes, for example, I pictures and P pictures. The I picture is image data encoded by intra-frame prediction, and includes a full-screen range that can be reproduced independently. The P picture is image data encoded by inter-frame prediction based on the I picture. The P picture cannot be reproduced alone, but can be reproduced in combination with the I picture.

The transmitting device 100 divides (fragments) the encoded images into pictures. Then, the transmitting device 100 transmits a portion of the divided pictures (for example, I picture) to the edge server 200a, and stores the remainder (for example, P picture) in a storage unit. The transmitting device 100 may also store the picture transmitted to the edge server 200a in the storage unit for playback (local reproduction), backup, and the like.

When a user operating the client 300 or the like requests a display of the P picture via the center server 200b and the edge server 200a, the transmitting device 100 reads the stored P picture and transmits the P picture to the edge server 200a.

The edge server 200a has a function of transmitting data (pictures) transmitted from the transmitting device 100 to the center server 200b by the same method as that of the transmitting device 100. The edge server 200a can be rephrased as a device having a function of virtualizing the transmitting device 100.

For example, the edge server 200a divides (fragments) the video transmitted from the transmitting device 100 into each picture. Then, the edge server 200a transmits a portion of the divided pictures (for example, I picture) to the center server 200b, and stores the remainder (for example, P picture) in the storage unit. Note that the edge server 200a may also store the picture transmitted to the center server 200b in the storage unit for playback (local reproduction), backup, and the like.

Normally, the center server 200b delivers only the I picture transmitted from the edge server 200a to the client 300b. The client 300b displays, for example, a video delivered using a viewer application. The viewer application is, for example, an application included in a browser for displaying and viewing a video. Since the I pictures are transmitted at regular intervals (for example, several images per second or one image every few seconds), a video (para-para cartoon, frame-by-frame (intermittent) video) in which a still image (I picture) is updated at regular intervals is displayed on the client 300b. The viewer application can be realized as an application using Media Source Extensions (MSE), which is an application programming interface for Hyper Text Markup Language (HTML) 5, for example. This enables streaming reproduction using HTTP download.

As described above, when the display of the P picture is requested, the transmitting device 100 reads the stored P picture and transmits the P picture to the edge server 200a. The edge server 200a transmits the received P picture to the center server 200b. The center server 200b delivers the transmitted P picture to the client 300b. The center server 200b may deliver the transmitted P picture as it is, or deliver the P picture to which only processing (such as changing a transmission packet format) other than conversion processing (such as recompression) for image data is applied. The viewer application of the client 300b synthesizes and displays the I picture already received and the P picture received later. As a result, the client 300b can display a smoother image. If the transferred data (for example, I picture) is stored in the storage unit in the client 300b, it can be used for synthesizing with the P picture received later. That is, it is not necessary to transmit the transferred data again from the transmitting device 100, the edge server 200a, and the center server 200b. Therefore, the amount of transmission data can be reduced as compared with the method of retransmitting all the video data including the P picture.

As described above, the center server 200b does not apply conversion processing such as recompression to the image data, and delivers the image data transmitted from the edge server 200a to the client 300b as it is or by processing only the transmission packet format. For example, the center server 200b does not need to perform processing of converting to a video with reduced quality in order to enable delivery at a low transmission rate. Therefore, it is possible to avoid an increase in the processing load of the center server 200*b* and deterioration of image quality. In addition, in the normal state, since only the I picture is delivered, the amount of communication can be suppressed. In this way, it is possible to reduce the line load and the processing load without deteriorating the quality.

Note that the I picture is a portion of the data constituting the video (moving image data), but can be treated as a still image. For example, the browser (viewer application) running on the client 300*b* may be able to display the I picture included in the moving image data as still image data. Therefore, the I picture can be displayed as the still image data without performing compression processing on a still image such as Joint Photographic Experts Group (JPEG). Compared to JPEG format still images, since the I picture has a smaller data size (higher compression efficiency), the line load and the processing load can be further reduced. In addition, even when the delivered video is used for image recognition, the I picture can be used as input data for image recognition without converting the video into the still image.

Although FIG. 2 illustrates only an example of delivering the video from the center server 200*b* to the client 300*b*, the delivery of the video from the edge server 200*a* to the client 300*a* can also be realized by the same procedure.

Figure 3:
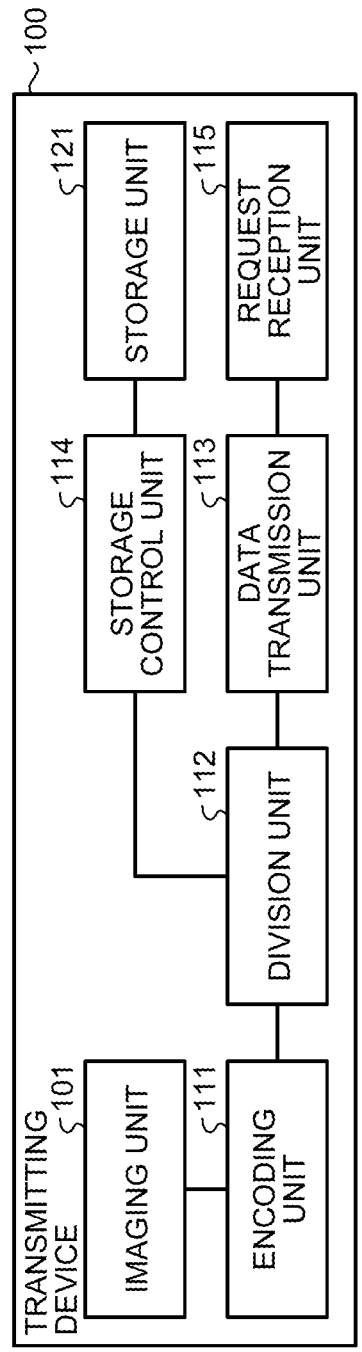
FIG. 3 is a functional block diagram of a transmitting device of the present embodiment.

Next, the details of the configuration of each device of the video delivery system of the present embodiment will be described. FIG. 3 is a block diagram illustrating an example of a functional configuration of the transmitting device 100 of the present embodiment.

As illustrated in FIG. 3, the transmitting device 100 includes an imaging unit 101, a storage unit 121, an encoding unit 111, a division unit 112, a data transmission unit 113, a storage control unit 114, and a request reception unit 115.

The imaging unit 101 captures and outputs a video (moving image data). The imaging unit 101 can be realized by, for example, an imaging element such as a Charge Coupled Device (CCD) and a CMOS image sensor (CIS), or a frame buffer capture such as a frame memory, a frame grabber, and a screen capture.

The storage unit 121 stores various data used in various processing by the transmitting device 100. For example, the storage unit 121 stores the video captured by the imaging unit 101.

The encoding unit 111 encodes the video input from the imaging unit 101. An encoding method by the encoding unit 111 may be any method, and for example, an encoding method according to a standard such as H.264 can be applied. The encoding unit 111 compresses and encodes the video, for example, and outputs a video including an I picture and a P picture. Each picture of the encoded video corresponds to a plurality of transmission data to be transmitted.

The division unit 112 divides the encoded video into data (first data) to be transmitted to the edge server 200*a* and data (second data) to be stored in the storage unit 121 without transmission. For example, the division unit 112 divides the encoded image for each picture so that the I picture is data (fragment data) to be transmitted to the edge server 200*a* and the P picture is data (fragment data) to be stored in the storage unit 121. The division unit 112 may divide the video so that each of the divided pictures becomes one file (fragment file). Regarding the data stored in the storage unit 121, the division unit 112 may divide the data so that a plurality of pictures are included in one file.

The method of dividing the data by the division unit 112 is not limited thereto, and any method may be used. For example, the division unit 112 may divide the encoded video into an I picture selected from a plurality of I pictures at a fixed number and other pictures (remaining I pictures and P pictures). In addition, for example, the division unit 112 may divide the encoded video into a P picture selected from the I picture and a plurality of P pictures at a fixed number and other pictures (remaining P pictures). In addition, for example, the division unit 112 may divide the encoded video into an I picture selected from a plurality of I pictures at a fixed number, a P picture selected from a plurality of P pictures at a fixed number, and other pictures (remaining I pictures and P pictures).

The data transmitted to the edge server 200*a* may be represented in a format that the edge server 200*a* can deliver as it is. For example, the division unit 112 may convert the divided data so that the format conforms to a standard such as Fragmented MP4 (fMP4).

The data transmitted to the edge server 200*a* may be represented in a format to which data (metadata) that can be converted into a format delivered by the edge server 200*a* is added. For example, the division unit 112 may add metadata including information necessary for conversion to the divided data so that the edge server 200*a* can convert the data into a format according to a standard such as fMP4. The information necessary for conversion includes, for example, information (IP address, port number, etc.) that identifies the transmitting device 100, time (such as the date, time, minute, and second of the image), and a position of the image within the time (for example, information indicating the number from the beginning).

The division unit 112 may change the size or encode amount of the data transmitted to the edge server 200*a* according to a band of the network 401. For example, the division unit 112 may divide data corresponding to a size that can be transmitted within an allocated band of the network 401 without delay or the like, or data having an encoding bit rate within the band of the network 401 as data to be transmitted to the edge server 200*a*. For example, in the case where the band of the network 401 is large, the division unit 112 divides a portion of the I picture and the P picture as the data to be transmitted to the edge server 200*a*, and may divide only the I picture or a portion of the I picture (such as thinning out the I pictures at a fixed number) as the data to be transmitted to the edge server 200*a* as the band becomes smaller. As an encoding method for partially delivering the P picture, for example, a method described in Japanese Patent No. 6239472 can be used.

The division unit 112 may change the size or encode amount of the data transmitted to the edge server 200*a* by dynamically switching the division method as described above according to the band of the network 401 or the request from the client 300 or the edge server 200*a*.

If the data encoded by the encoding unit 111 is simply divided, the size of the divided data may be inconsistent. For example, in a case where the encoding unit 111 has a function of adjusting the encode amount of each picture according to the band of the network 401, the size of each I picture and the size of each P picture may be different from each other. Therefore, among each of the pictures encoded in this way, for example, if the I picture is divided as the data to be transmitted to the edge server 200*a*, the size of each of the divided I pictures may also be different from each other.

Therefore, the encoding unit 111 may adjust the encode amount according to the band of the network 401 so that the size or the encoding bit rate of the divided data becomes the size or the encoding bit rate that can be transmitted within the band of the allocated network 401 without delay or the like. For example, if the division unit 112 divides the video so that only the I picture is transmitted to the edge server 200a, the encoding unit 111 may encode the video so that the size of the I picture becomes a certain size that can be transmitted within the band of network 401 without delay, or becomes the encoding bit rate within the band of the network 401.

The data transmission unit 113 transmits data to an external device such as the edge server 200a. For example, the data transmission unit 113 transmits the data (first data) to be transmitted to the edge server 200a among the data divided by the division unit 112 to the edge server 200a. In addition, in a case where the data transmission unit 113 receives a data transmission request stored in the storage unit 121 by the request reception unit 115 (described later), the data transmission unit 113 transmits requested data to the edge server 200a.

The storage control unit 114 controls storage processing for the storage unit 121. For example, the storage control unit 114 stores the data that is not transmitted to the edge server 200a among the data divided by the division unit 112 in the storage unit 121. The storage control unit 114 may store the data (first data) transmitted to the edge server 200a in the storage unit 121. At this time, the storage control unit 114 may manage the stored data using metadata indicating that the transmitted data (first data) has been transmitted or that the second data has not been transmitted. The storage control unit 114 may delete the data stored in the storage unit 121 according to a predetermined condition. For example, the storage control unit 114 may delete the data for which a certain period of time has passed since the data was stored.

The request reception unit 115 receives a transmission request of the data stored in the storage unit 121 from the edge server 200a. In the case of a configuration in which the request is transmitted from the client 300 via a control server or the like other than the edge server 200a, the request reception unit 115 may receive the transmission request for data stored in the storage unit 121 from such a control server.

Each of the above units (the encoding unit 111, the division unit 112, the data transmission unit 113, the storage control unit 114, and the request reception unit 115) is realized by, for example, one or more processors. For example, each of the units may be realized by causing a processor such as a central processing unit (CPU) to execute a program, that is, by software. Each of the units may be realized by a processor such as a dedicated integrated circuit (IC), that is, hardware. Each of the units may be realized by using software and hardware in combination. When using a plurality of processors, each processor may realize one of the units or two or more of the units.

Note that each function of the transmitting device 100 may be delivered to a plurality of physically or logically different devices. For example, it may be divided into a device (video input and encoder in FIG. 2) including the imaging unit 101 and the encoding unit 111 and a device (fragmentation and storage unit in FIG. 2) including each remaining unit. In this case, the data encoded by the encoding unit 111 is input to the latter device by, for example, a communication path such as a network or a coaxial cable. The latter device may be configured to acquire the encoded data via the communication path.

Next, a configuration of the edge server 200a will be described. The edge server 200a delivers a delivery list and determination information to the client 300a via the network 402. The delivery list is a list that describes information about the data to be delivered (hereinafter, also referred to as content). Usually, a content deliverer describes metadata such as a content acquisition destination and a bit rate in the delivery list. A content acquirer can specify the content to be acquired by acquiring and analyzing the delivery list.

The content described in the delivery list may include not only content that can be transmitted, but also content that cannot be transmitted, content that is not permitted to be transmitted, and the like. The determination information is information for the receiving device (client 300a) to determine whether or not to request transmission of the content included in the delivery list.

Figure 4:
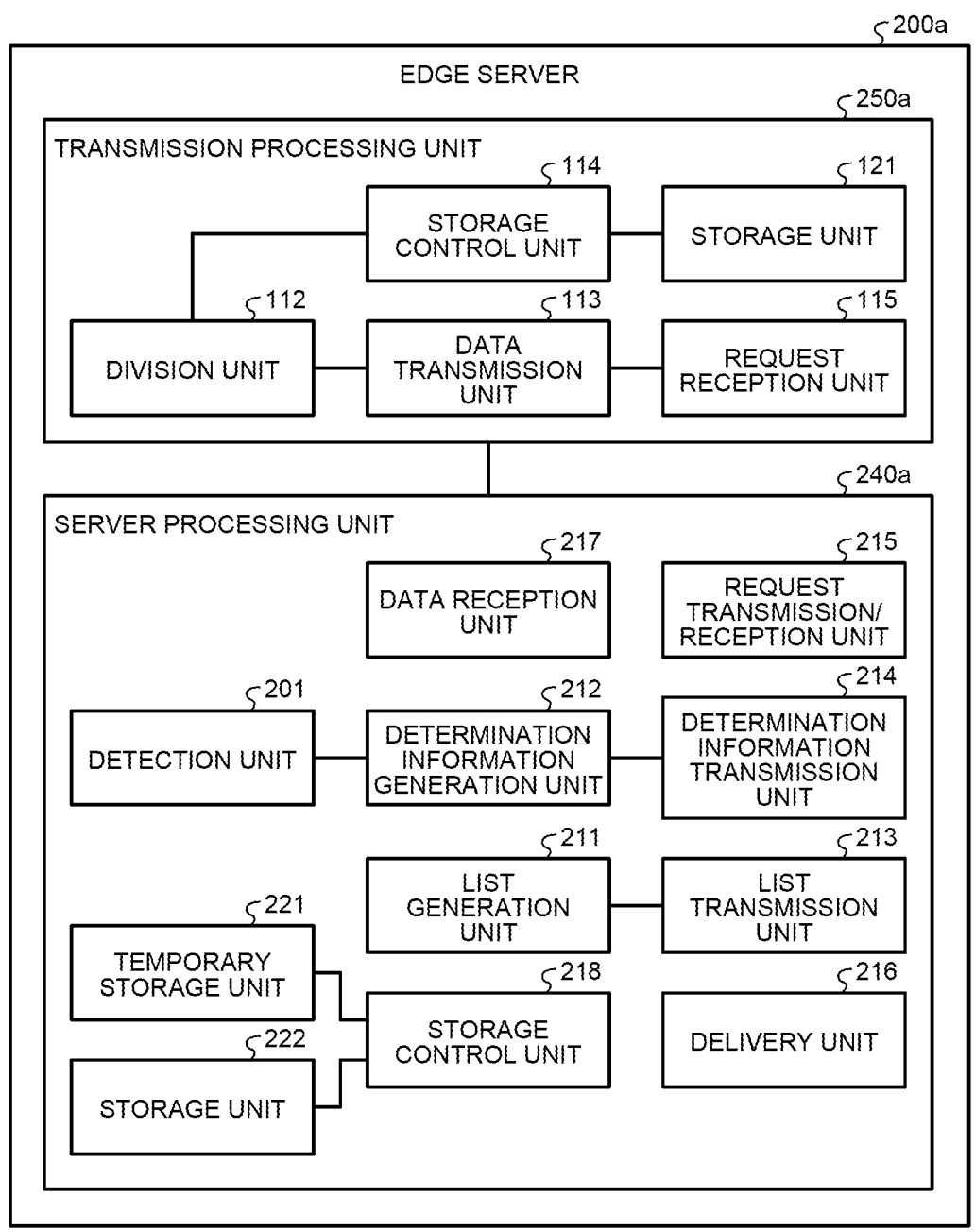
FIG. 4 is a functional block diagram of an edge server of the present embodiment.

FIG. 4 is a block diagram illustrating an example of a functional configuration of the edge server 200a of the present embodiment. As illustrated in FIG. 4, the edge server 200a includes a server processing unit 240a and a transmission processing unit 250a. The server processing unit 240a corresponds to a function as a server that delivers the data received from the transmitting device 100 to the client 300a. The transmission processing unit 250a is a function of further transmitting the data received from the transmitting device 100 to the center server 200b. A data transmission destination of the transmitting device 100 is the edge server 200a, but a data transmission destination of the transmission processing unit 250a is the center server 200b. That is, the transmission processing unit 250a functions as a device that virtualizes the transmitting device 100 with respect to the center server 200b.

The server processing unit 240a includes a detection unit 201, a list generation unit 211, a determination information generation unit 212, a list transmission unit 213, a determination information transmission unit 214, a request transmission/reception unit 215, a delivery unit 216, a data reception unit 217, a storage control unit 218, a temporary storage unit 221, and a storage unit 222.

The detection unit 201 detects that the content can be transmitted. For example, the detection unit 201 determines that the content can be transmitted when the content is provided by a providing device (such as the transmitting device 100) that provides the content. The detection unit 201 may monitor a storage area (for example, the temporary storage unit 221) in which the content is stored, and may determine that the content can be transmitted when the content is stored.

The list generation unit 211 generates a delivery list. The list generation unit 211 generates the delivery list, for example, when the client 300a requests to generate and transmit the delivery list. A trigger for generating the delivery list is not limited thereto, and may be any trigger. For example, the list generation unit 211 may generate the delivery list of contents to be transmitted in a next period every time a certain period of time elapses. The list generation unit 211 may generate the delivery list when the content is provided by the providing device or when the generation is instructed.

Figure 5:
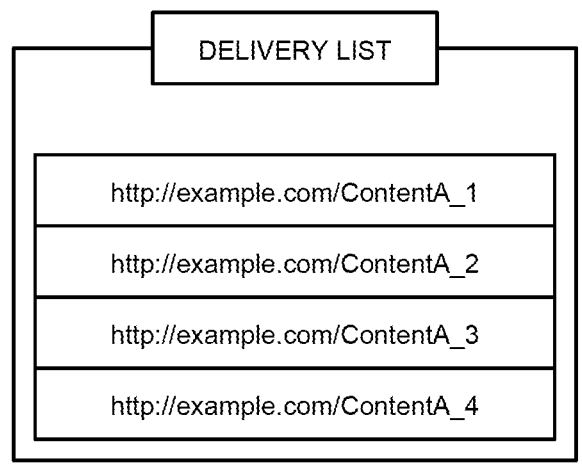
FIG. 5 is a diagram illustrating an example of a data structure of a delivery list.

FIG. 5 is a diagram illustrating an example of a data structure of the delivery list. As illustrated in FIG. 5, the delivery list includes identification information that identifies the content. FIG. 5 illustrates an example of using a Uniform Resource Locator (URL) of the content as the identification information. As the identification information, information other than the URL may be used as long as the content can be identified. The delivery list may include information other than the identification information. In the present embodiment, for example, the delivery list including the URL for each divided data (picture, etc.) is created.

Returning to FIG. 4, the determination information generation unit 212 generates determination information. For example, the determination information generation unit 212 generates determination information indicating that the content can be transmitted when the content can be transmitted, and generates determination information indicating that the content cannot be transmitted when the content cannot be transmitted. In addition, when a situation indicating whether or not the content can be transmitted changes, the determination information generation unit 212 generates updated determination information to correspond to the changed situation.

The determination information generation unit 212 generates the determination information, for example, when the client 300*a* requests that the determination information is generated and transmitted. When the delivery list is generated by the list generation unit 211, the determination information generation unit 212 may generate the determination information at that time. A trigger for generating the determination information is not limited thereto, and may be any trigger. For example, the determination information generation unit 212 may detect whether or not the content can be transmitted by using, for example, the detection unit 201 every time a certain period of time elapses, and may generate updated determination information according to the detection result.

Figure 6:
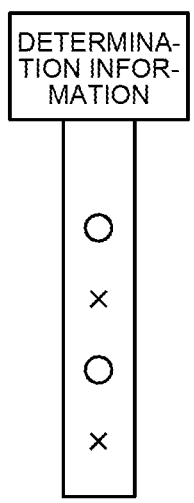
FIG. 6 is a diagram illustrating an example of a data structure of determination information.

FIG. 6 is a diagram illustrating an example of a data structure of the determination information. The determination information in FIG. 6 is an example of determination information for determining whether four contents described in the delivery list in FIG. 5 can be transmitted. For example, "○" indicates that the content can be transmitted, and "x" indicates that the content cannot be transmitted. In the example of FIG. 6, four determination information ("○" or "x") corresponding to the four contents ("ContentA_1", "ContentA_2", "ContentA_3", and "ContentA_4") corresponding to four URLs of FIG. 5 are designated in the corresponding order.

If it is a method that can designate the determination information for each content, the determination information of the data structure other than FIG. 6 may be used. For example, the content identification information may be associated with the determination information. In order to be able to identify which delivery list the determination information corresponds to, the information for identifying the delivery list may be associated with the determination information.

That the content can be transmitted is for example, a state in which the content to be delivered is provided to the edge server 200*a* and can be transmitted to the client 300*a*. That the content cannot be transmitted is for example, a state in which the content to be delivered has not yet been provided to the edge server 200*a* and cannot be transmitted to the client 300*a*. The edge server 200*a* may transmit the content (pull type transmission) in response to the request from the client 300*a*, or may transmit the content (push type transmission) without the request from the client 300*a*.

Regardless of whether the content is provided or not, the edge server 200*a* may designate whether or not the content can be transmitted. For example, in order to reduce the communication load, determination information indicating that transmission is not possible may be generated for a portion or all of a plurality of provided contents, and these contents may not be transmitted. In this way, the content that can be transmitted may not be transmittable thereafter.

The determination information may be one or may be plural for each content. For example, one or more metadata of the content may be used as the determination information. The metadata is, for example, range information indicating the range of the content, the data length of the content, the type of the content, and the like. The range information is, for example, information that designates the range of data to be delivered as the content among certain data. When the range information is confirmed, the confirmed range information is set as the determination information, and when the range information is unconfirmed, predetermined information (unconfirmed information) indicating that the range information is unconfirmed is set as the determination information. When the unconfirmed information is set in the range information as the determination information, the client 300*a* can determine that the corresponding content cannot be transmitted. In this way, when the metadata is used as the determination information, it is sufficient to define a data format that can determine whether or not the content can be transmitted based on the metadata.

Returning to FIG. 4, the list transmission unit 213 transmits the delivery list generated by the list generation unit 211 to the client 300*a*. For example, the list transmission unit 213 transmits the delivery list to the client 300*a* in advance before starting the transmission of the content. The determination information transmission unit 214 transmits the determination information generated by the determination information generation unit 212 to the client 300*a*.

The request transmission/reception unit 215 transmits and receives various requests. For example, the request transmission/reception unit 215 receives a delivery list transmission request, a determination information transmission request, and a content transmission request from the client 300*a*. In addition, the request transmission/reception unit 215 transmits a transmission request for the content stored in the storage unit 121 to the transmitting device 100.

The delivery unit 216 transmits the requested content to the client 300*a* that has transmitted the transmission request. When the push type transmission is adopted, the delivery unit 216 may transmit the content without the request from the client 300*a*.

The data reception unit 217 receives the data transmitted from the transmitting device 100. For example, the data reception unit 217 receives the divided data as the data to be transmitted to the edge server 200*a*. When a transmission request for data stored in the storage unit 121 is transmitted, the data reception unit 217 receives the data transmitted by the transmitting device 100 in response to the transmission request.

The storage control unit 218 controls storage processing for the temporary storage unit 221 and the storage unit 222. When the data transmitted from the transmitting device 100 and the data transmitted from the transmitting device 100 converted into a format to be delivered by the edge server 200*a* are configured to be stored in the storage unit 222 and then delivered, the processing of storing data in the storage unit 222 may not be able to keep up with a delivery speed, the processing of writing data to the storage unit 222 may freeze temporarily, or the like, resulting in an abnormality in the writing processing, which may prevent normal delivery. Therefore, the storage control unit 218 stores the data transmitted from the transmitting device 100 in the temporary storage unit 221 data is a storage medium that does not cause the above-mentioned abnormality in the writing processing. In the case where the data is stored in the temporary storage unit 221, the delivery unit 216 reads the data from the temporary storage unit 221 and delivers the data to the client 300*a*. At this time, the data transmitted from the transmitting device 100 is finally stored in the storage unit 222. Therefore, the delivery unit 216 may operate as if it were delivered from the storage unit 222 in response to the request from the client 300*a*. That is, the data saved in the temporary storage unit 221 may be returned in response to the request for the data saved in the storage unit 222. Such a function can be realized by recording the association of these files on the edge server 200*a* (database, file, symbolic link, etc.) and referencing it at the time of delivery.

Then, the storage control unit 218 performs processing (writing processing) of writing the data stored in the temporary storage unit 221 to the storage unit 222. In the writing processing, the storage control unit 218 may combine a plurality of data stored in the temporary storage unit 221 into one data and store the combined data in the storage unit 222. For example, the storage control unit 218 may combine a plurality of data captured within a certain period of time so as to be included in one file, and write the combined file to the storage unit 222. As a result, it is possible to avoid a problem that the data cannot be stored because the number of files stored in the storage unit 222 exceeds the allowable amount of an operating system, for example.

After combining the plurality of data into one data and storing the combined data in the storage unit 222, when a transmission request for the data included in the combined data is received from the client 300*a*, a function of specifying the corresponding data from the combined data is required. Therefore, for example, the list generation unit 211 may update the delivery list so as to include specifying information for specifying the corresponding data. The list generation unit 211 creates a delivery list in which the specifying information indicating a position of data in the combined file (byte offset from the beginning, etc.) is associated with the identification information (URL, etc.) of the data, and transmits the created delivery list to the client 300*a*.

In the case where the client 300*a* requests the transmission of data by referring to the updated delivery list, the client 300*a* designates the associated specifying information together with the identification information of the requested data. For example, the client 300*a* requests the data by adding the specifying information to a URL indicating the identification information of the data. The client 300*a* may request the data by the transmission request including the specifying information in a header (such as an HTTP extension header).

The file name requested at this time may be an original file name before division. This makes it easy to determine whether the data has already been received and cached on the client 300*a*, and it is possible to suppress a re-acquisition of the acquired data. In this case, the edge server 200*a* needs to specify the combined data (combined file) from the original divided file (fragment file). For this purpose, there are methods in which (1) the information of the combined file for the fragment file is transmitted in advance as the specifying information to be transmitted to the client 300*a*, and the client 300*a* describes it in the HTTP extension header at the time of request, and (2) the edge server 200*a* specifies the combined file by itself when responding to the request from the requested fragment file name. Regarding (2), it is conceivable to (2-1) record the association with the fragment file when creating the combined file (database, file, symbolic link, etc.), and (2-2) set the self-solving by the naming convention (for example, in the example of FIG. 5, the combined file name of ContentsA_1 to ContentsA_4 is ContentsA).

The edge server 200*a* specifies the corresponding data from the combined data using the specifying information transmitted from the client 300*a*, and delivers the specified data to the requesting client 300*a*.

The storage control unit 218 may delete the data stored in the storage unit 222 according to a predetermined condition. For example, the storage control unit 218 may delete the data for which a certain period of time has passed since the data was stored. The storage control unit 218 may delete the data step by step every time a certain period of time elapses. For example, the storage control unit 218 deletes all or a portion of the P picture from the storage unit 222 after a predetermined period (for example, one day) elapses, and thereafter, further deletes the P picture or the I picture from the storage unit 222 so as to thin out the P picture or the I picture step by step every time a predetermined period (which may be the same as or different from the first period) elapses. By such processing, when it is desired to reduce a storage capacity for long-term recording, it is possible to obtain a video whose intermittentness increases with the passage of time without performing, for example, processing of converting the image into a video with reduced quality. For the stepwise deletion of the P picture, for example, the encoding method described in Japanese Patent No. 6239472 can be used.

In addition, for example, the storage control unit 218 may preferentially delete the transmitted data. At this time, the storage control unit 218 may determine whether or not the data has been transmitted by using the metadata indicating whether or not the data has been transmitted. Further, the storage control unit 218 may prepare other metadata for reference in the deletion processing in advance. Such metadata is, for example, data that can determine which data corresponds to which picture. More specifically, the metadata includes, for example, the time (such as the date, time, minute, and second of the image), the position of the image within the time (for example, information indicating the number from the beginning), the file name, and a byte offset from the beginning of the file.

The temporary storage unit 221 temporarily stores the received data. For example, the temporary storage unit 221 can be configured by a volatile memory such as a Dynamic Random Access Memory (DRAM).

The storage unit 222 stores various data used by the edge server 200*a*. For example, the storage unit 222 stores the content to be delivered, the generated delivery list, and the generated determination information. The storage unit 222 can be configured by any commonly used storage medium such as a memory card, a Random Access Memory (RAM), a Hard Disk Drive (HDD), and an optical disk.

Note that if the above-mentioned abnormality in the writing processing does not occur, the temporary storage unit 221 may not be provided.

The transmission processing unit 250*a* includes a storage unit 121, a division unit 112, a data transmission unit 113, a storage control unit 114, and a request reception unit 115. As described above, the transmission processing unit 250*a* has functions other than the imaging unit 101 and the encoding unit 111 among the functions provided in the transmitting device 100. The transmission processing unit 250*a* may further include functions corresponding to the imaging unit 101 and the encoding unit 111.

The transmission processing unit 250*a* uses the video captured by the imaging unit 101 and transmitted from the transmitting device 100 instead of the video encoded by the encoding unit 111. In addition, in the transmission processing unit 250*a*, the center server 200*b* serves as a data transmission destination and a request reception source. Since other functions are the same as those of the transmitting device 100, the same reference numerals are given and the description thereof will be omitted.

For example, the transmission processing unit 250*a* inputs the video transmitted from the transmitting device 100 and stored in the storage unit 222 to the division unit 112, instead of the video encoded by the encoding unit 111. The division unit 112 divides the input video (already encoded video) into data (first data) to be transmitted to the center server 200b and data (second data) stored in the storage unit 121 without transmission.

Each of the above units (the division unit 112, the data transmission unit 113, the storage control unit 114, the request reception unit 115, the detection unit 201, the list generation unit 211, the determination information generation unit 212, the list transmission unit 213, the determination information transmission unit 214, the request transmission/reception unit 215, the delivery unit 216, the data reception unit 217, and the storage control unit 218) is realized by, for example, one or a plurality of processors. For example, each of the above units may be realized by causing a processor such as a CPU to execute a program, that is, by software. Each of the above units may be realized by a processor such as a dedicated IC, that is, by hardware. Each of the units may be realized by using software and hardware in combination. When using a plurality of processors, each processor may realize one of the units or two or more of the units.

Note that each function of the edge server 200a may be delivered to a plurality of physically or logically different devices. For example, it may be divided into a server device that transmits a delivery list and a server device that transmits content. In addition, for example, it may be divided into a server device that receives data from the transmitting device 100 and stores the data in the temporary storage unit 221 and the storage unit 222, and a server device that reads data from the temporary storage unit 221 and the storage unit 222 and delivers the data.

Figure 7:
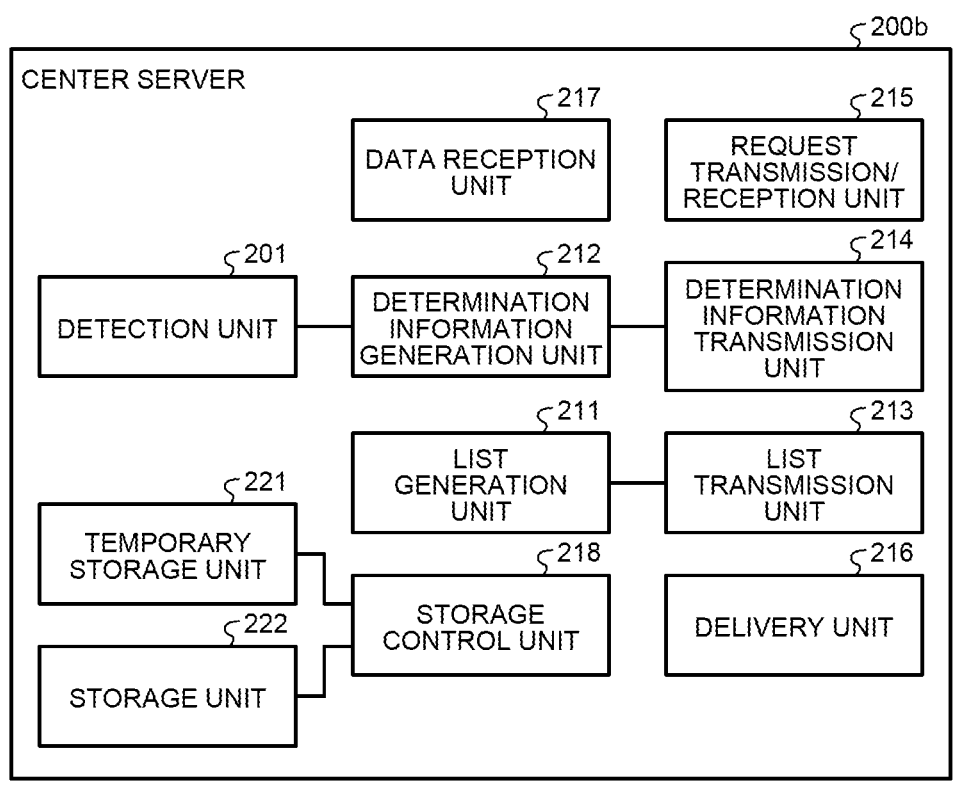
FIG. 7 is a functional block diagram of a center server of the present embodiment.

Next, a function of the center server 200b will be described. The center server 200b is a server having a function corresponding to the server processing unit 240a of the edge server 200a. FIG. 7 is a block diagram illustrating an example of a functional configuration of the center server 200b of the present embodiment.

The center server 200b differs from the edge server 200a in that it receives video from the edge server 200a instead of the transmitting device 100 and delivers the video to the client 300b instead of the client 300a. That is, the center server 200b has the same functions as the server processing unit 240a except that the data reception source is the edge server 200a instead of the transmitting device 100 and the data transmission destination is the client 300b instead of the client 300a. Therefore, the same reference numerals as those in FIG. 4 are assigned and detailed description thereof will be omitted.

Next, a function of the client 300 will be described. In the following, the client 300a will be described as an example. The client 300b has the same functions as the client 300a except that a connection destination is replaced from the edge server 200a to the center server 200b.

Figure 8:
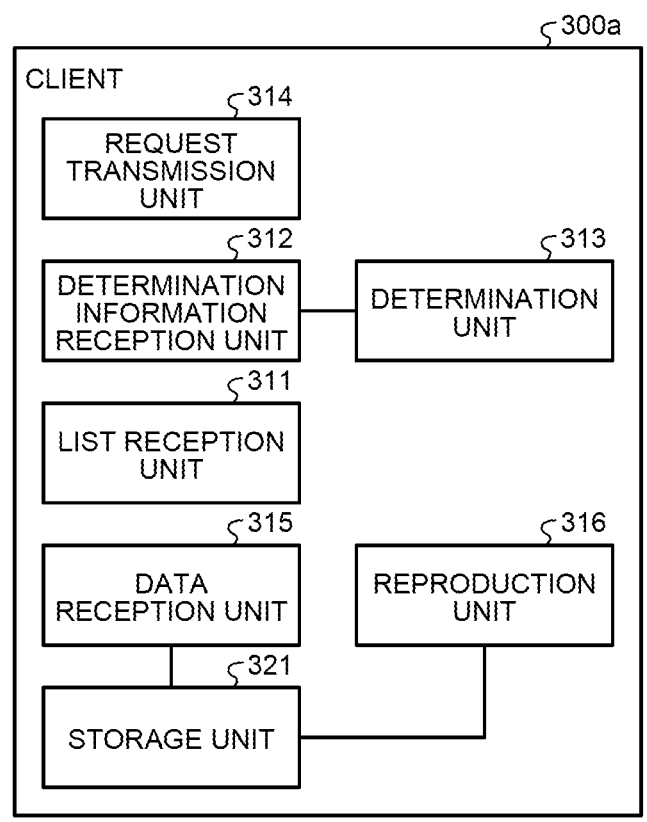
FIG. 8 is a functional block diagram of a client according to the present embodiment.

As illustrated in FIG. 8, the client 300a includes a list reception unit 311, a determination information reception unit 312, a determination unit 313, a request transmission unit 314, a data reception unit 315, a reproduction unit 316, and a storage unit 321.

The list reception unit 311 receives the delivery list from the edge server 200a. The determination information reception unit 312 receives the determination information from the edge server 200a.

The determination unit 313 determines the content for which transmission is requested based on the delivery list and the determination information. For example, the determination unit 313 determines the content in which "○" is set as the determination information as illustrated in FIG. 6 among the contents whose URL is described in the delivery list illustrated in FIG. 5, as the content for which transmission is requested. In the case where the above-mentioned range information is used as the determination information, the determination unit 313 determines, for example, the content in which the unconfirmed information is not set in the range information as the content for which transmission is requested. In the case where a plurality of determination information is used, the determination unit 313 may determine the content for which transmission is requested according to a combination of the plurality of determination information. For example, in the case where all the determination information indicates that the content can be transmitted, the determination unit 313 determines that the corresponding content is the content for which transmission is requested.

The request transmission unit 314 transmits a transmission request for the content determined to request transmission to the edge server 200a. The data reception unit 315 receives the content transmitted in response to the transmission request transmitted by the request transmission unit 314 from the edge server 200a. The reproduction unit 316 reproduces the received content.

The storage unit 321 stores various data used by the client 300a. For example, the storage unit 321 stores the transmitted delivery list, the transmitted determination information, and the delivered content.

Each of the above units (the list reception unit 311, the determination information reception unit 312, the determination unit 313, the request transmission unit 314, the data reception unit 315, and the reproduction unit 316) is realized by, for example, one or a plurality of processors. For example, each of the above units may be realized by causing a processor such as a CPU to execute a program, that is, by software. Each of the above units may be realized by a processor such as a dedicated IC, that is, by hardware. Each of the units may be realized by using software and hardware in combination. When using a plurality of processors, each processor may realize one of the units or two or more of the units.

By using the delivery list and the determination information as described above, the edge server 200a does not need to create and transmit the delivery list every time there is an update, for example. In addition, the client 300a can more easily analyze the updated part by referring to the determination information. That is, it is possible to efficiently acquire and analyze the same information as the latest delivery list without reacquiring and reanalyzing the delivery list.

Note that, without using the determination information, for example, the delivery list may be created and transmitted every time the data is updated. In this case, the functions related to the determination information (the determination information generation unit 212, the determination information transmission unit 214, the determination information reception unit 312, etc.) may not be provided. In addition, when, for example, the push type transmission is adopted, the edge server 200a may deliver the video to the client 300a without using the delivery list.

Figure 9:
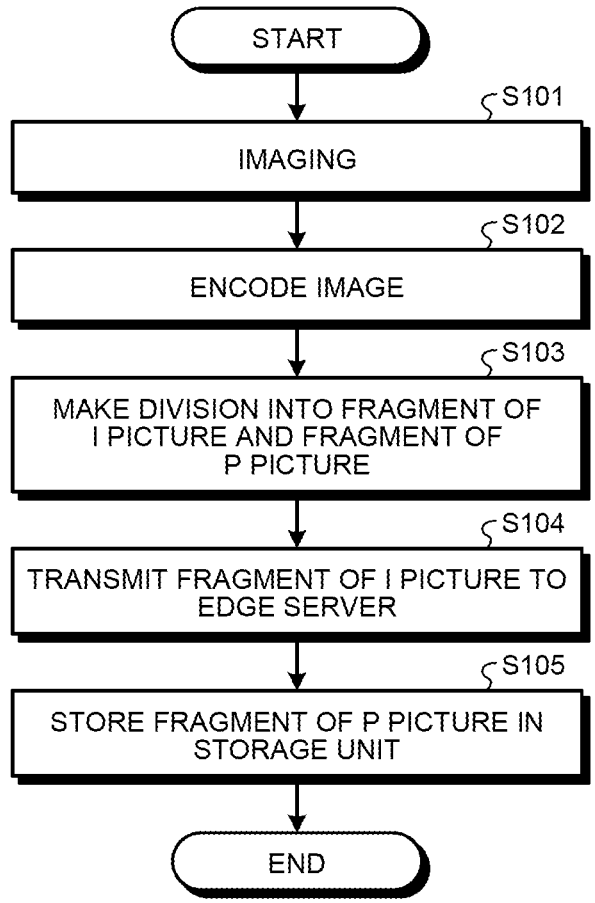
FIG. 9 is a flowchart of transmission processing according to the present embodiment.

Next, data transmission processing by the transmitting device 100 according to the present embodiment will be described. FIG. 9 is a flowchart illustrating an example of transmission processing in the present embodiment.

The imaging unit 101 captures a video to be delivered (step S101). The encoding unit 111 encodes the video input from the imaging unit 101 (step S102). The division unit 112 divides the data to be transmitted to the edge server 200a and the data to be stored in the storage unit 121. For example, the division unit 112 divides the input video into a fragment of an I picture and a fragment of a P picture (step S103). The data transmission unit 113 transmits the fragment of the I picture to the edge server 200a (step S104). The storage control unit 114 stores the fragment of the P picture in the storage unit 121 (step S105).

Figure 10:
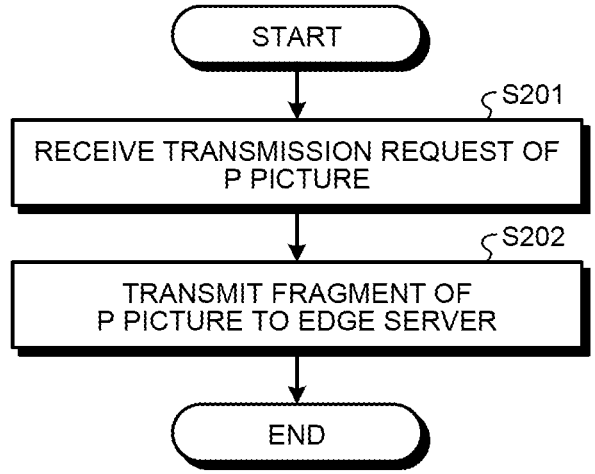
FIG. 10 is a flowchart of transmission processing of stored data.

Next, transmission processing of the data stored in the storage unit 121 will be described. FIG. 10 is a flowchart illustrating an example of transmission processing of the data stored in the storage unit 121.

The request reception unit 115 receives a transmission request for data stored in the storage unit 121 from the edge server 200a (or the control server) (step S201). In the case where the P picture is stored in the storage unit 121, the request reception unit 115 receives the transmission request of any P picture among the stored P pictures. The data transmission unit 113 reads the requested P picture from the storage unit 121 and transmits the P picture to the edge server 200a (step S202).

Figure 11:
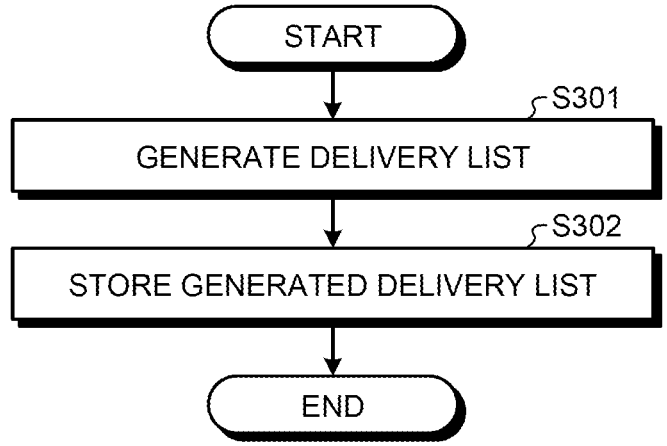
FIG. 11 is a flowchart of transmission processing by the edge server.

Next, list generation processing by the edge server 200a according to the present embodiment configured in this way will be described. The list generation processing is processing in which the edge server 200a generates the delivery list. The list generation unit 211 of the center server 200b can also generate the delivery list by the same procedure. FIG. 11 is a flowchart illustrating an example of the list generation processing in the present embodiment.

The list generation unit 211 of the edge server 200a generates the delivery list in response to a request from, for example, the client 300a (step S301). The list generation unit 211 stores the generated delivery list in, for example, the storage unit 222 (step S302).

As an example, it is assumed that ContentA_1, ContentA_2, ContentA_3, and ContentA_4, which are temporally continuous contents, exist as contents to be delivered, and ContentA_1 and ContentA_3 can be delivered. In this case, the list generation unit 211 generates a delivery list for delivering ContentA_1, ContentA_2, ContentA_3, and ContentA_4. FIG. 4 described above illustrates an example of the delivery list generated at this time.

Figure 12:
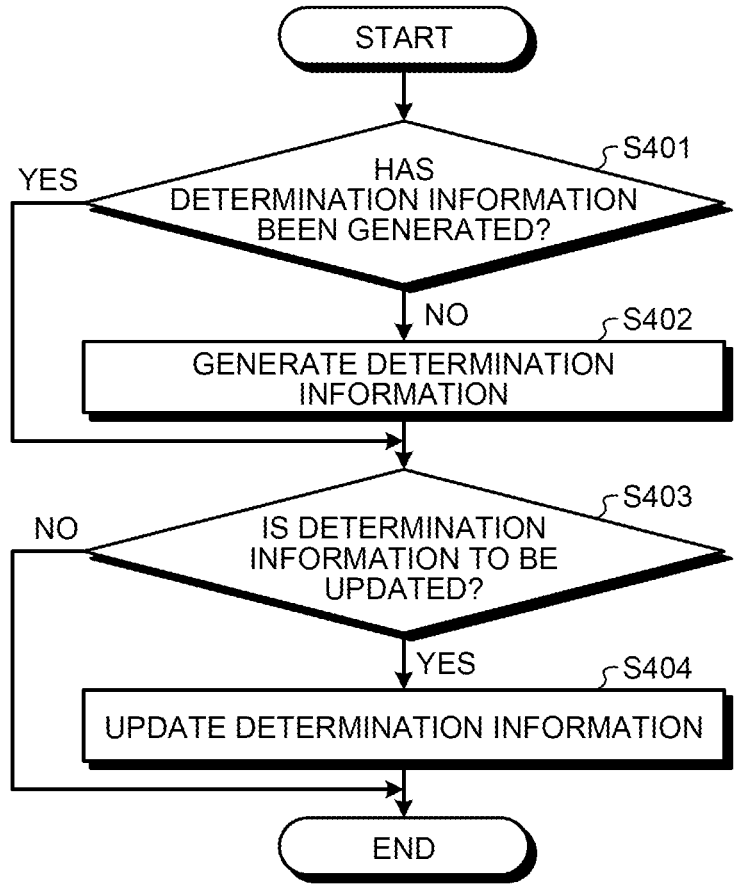
FIG. 12 is a flowchart of list generation processing according to the present embodiment.

Next, determination information generation processing by the edge server 200a according to the present embodiment will be described. The determination information generation processing is processing in which the edge server 200a generates the determination information. The determination information generation unit 212 of the center server 200b can also generate the determination information by the same procedure. The determination information generation processing is executed, for example, when the client 300a requests transmission of determination information. FIG. 12 is a flowchart illustrating an example of the determination information generation processing in the present embodiment.

The determination information generation unit 212 of the edge server 200a determines whether or not the determination information has been generated for the content to be delivered (step S401). If the determination information has not been generated (step S401: No), the determination information generation unit 212 generates the determination information for the content (step S402). FIG. 6 described above illustrates an example of the determination information generated for the example described in FIG. 11 (an example in which ContentA_1 and ContentA_3 can be delivered).

After the determination information is generated, and when the determination information has already been generated (step S401: Yes), the determination information generation unit 212 determines whether or not to update the generated determination information (step S403). For example, the determination information generation unit 212 determines that the determination information is updated when a detection result indicating that the content can be transmitted is received from the detection unit 201.

If it is determined that the determination information is to be updated (step S403: Yes), the determination information generation unit 212 updates the determination information (step S404). After updating the determination information, and when it is determined that the determination information is not updated (step S403: No), the determination information generation processing is terminated.

The edge server 200a makes the generated delivery list and determination information available for delivery via the network 402. The client 300a can access the edge server 200a to acquire the delivery list and the determination information.

Figure 13:
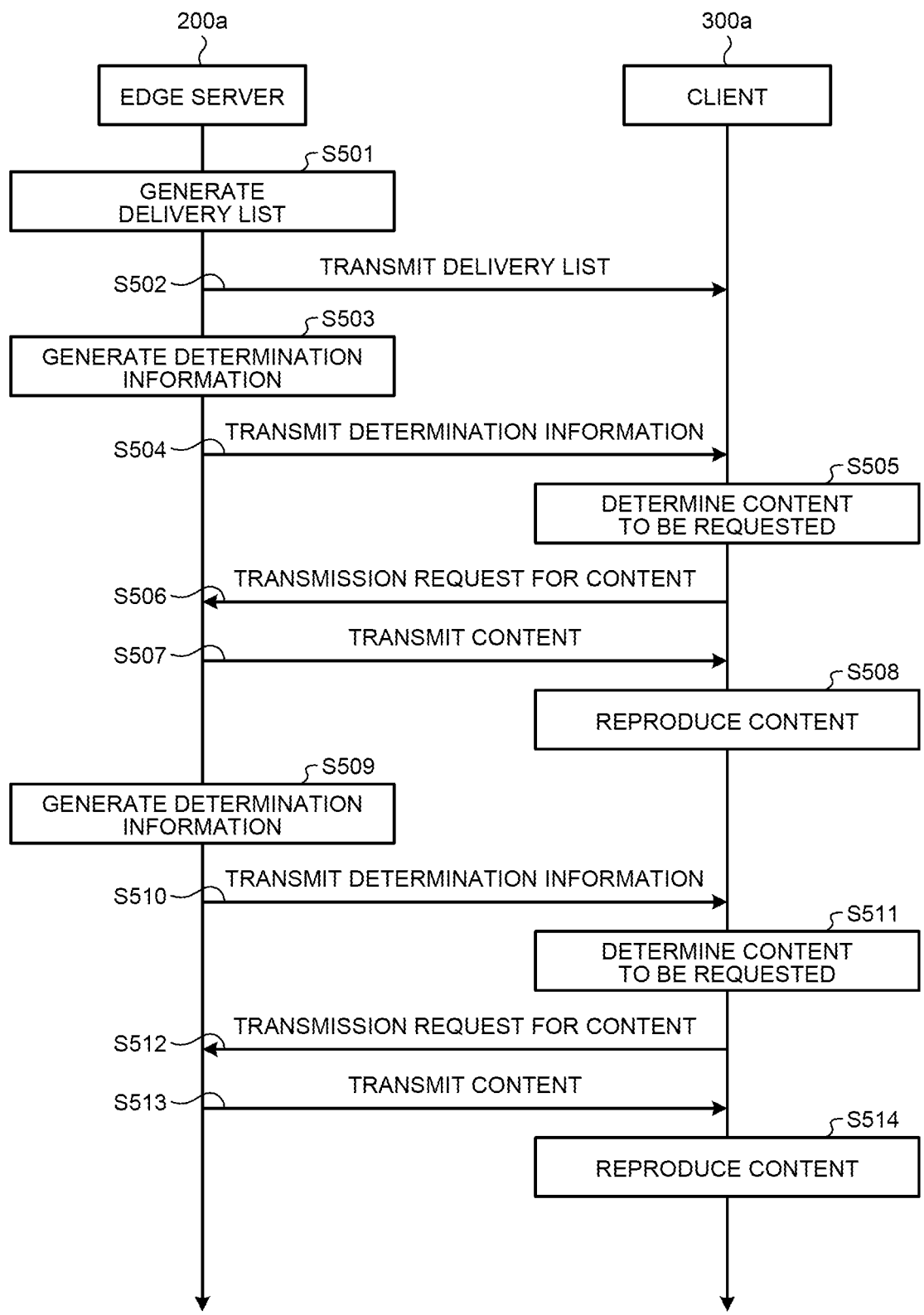
FIG. 13 is a flowchart of determination information generation processing according to the present embodiment.

Next, content delivery processing by the communication system according to the present embodiment will be described. FIG. 13 is a sequence diagram illustrating an example of content delivery processing in the present embodiment. FIG. 13 describes an example in which the edge server 200a delivers the content to the client 300a. The same procedure can be applied when the center server 200b delivers the content to the client 300b.

The list generation unit 211 of the edge server 200a generates the delivery list (step S501). Such processing corresponds to, for example, the above-mentioned list generation processing. The list transmission unit 213 of the edge server 200a transmits the delivery list to the client 300a, for example, in response to the request from the client 300a (step S502).

The determination information generation unit 212 of the edge server 200a generates the determination information (step S503). Such processing corresponds to, for example, the above-mentioned determination information generation processing. The determination information transmission unit 214 of the edge server 200a transmits the determination information to the client 300a, for example, in response to the request from the client 300a (step S504).

The list reception unit 311 of the client 300a receives the delivery list, and the determination information reception unit 312 receives the determination information. After that, the determination unit 313 of the client 300a determines the content for which transmission is requested by using the received delivery list and the determination information (step S505). For example, in the case where the delivery list illustrated in FIG. 5 is received, the determination unit 313 obtains URLs for acquiring ContentA_1 to ContentA_4 by analyzing the received delivery list. In addition, the determination unit 313 analyzes the received determination information and determines the content that can be transmitted among the contents described in the delivery list.

Figure 14:
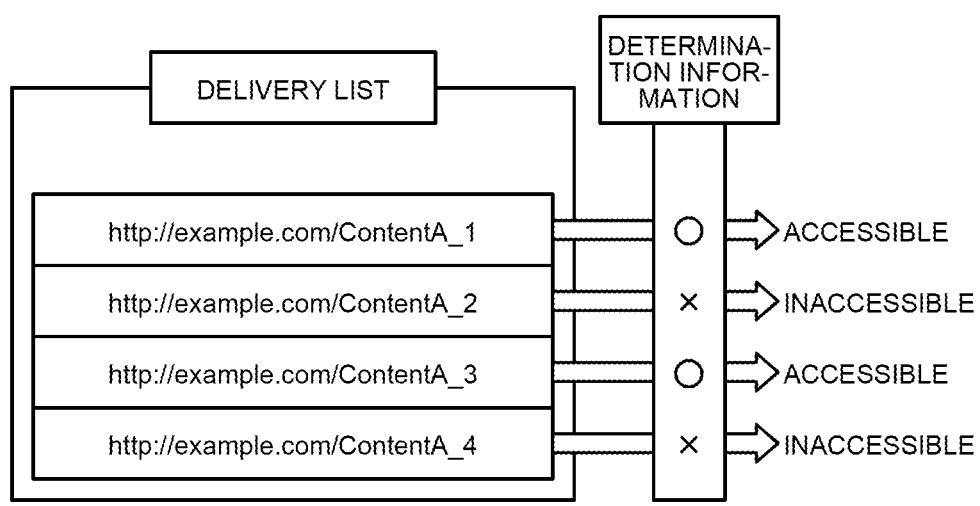
FIG. 14 is a sequence diagram of content delivery processing in the present embodiment.

FIG. 14 is a diagram illustrating an example of determining the delivery list illustrated in FIG. 5 by using the determination information illustrated in FIG. 6. As illustrated in FIG. 14, by combining the URL for acquiring ContentA_1 described in the delivery list and the determination information corresponding to ContentA_1, the determination unit 313 can determine that ContentA_1 can be transmitted (accessible). Similarly, the determination unit 313 can determine that ContentA_2 cannot be transmitted (inaccessible).

Returning to FIG. 13, the request transmission unit 314 transmits a transmission request for the content determined to request transmission to the edge server 200a (step S506). The delivery unit 216 of the edge server 200a transmits the requested content to the client 300a (step S507). The data reception unit 315 of the client 300a receives the content, and the reproduction unit 316 reproduces the received content (step S508).

In the case where the content expressed in a format that can be delivered as it is by the edge server 200a is transmitted from the transmitting device 100, the delivery unit 216 does not convert the content transmitted from the transmitting device 100 and directly transmits the content to the client 300a. In the case where the content is transmitted in a format to which metadata that can be converted into a format delivered by the edge server 200a is added, the delivery unit 216 converts the transmitted content into a format that can be delivered according to the metadata, and transmits the converted content to the client 300a.

Thereafter, it is assumed that ContentA_2 is ready for delivery. At this time, the detection unit 201 of the edge server 200a detects that ContentA_2 is ready for delivery. The determination information generation unit 212 generates the determination information updated according to the detection result (step S509).

Figure 15:
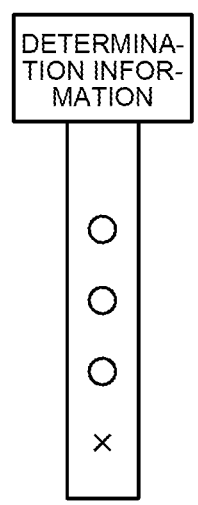
FIG. 15 is a diagram illustrating an example of determining a delivery list using the determination information.

FIG. 15 is a diagram illustrating an example of the updated determination information. As illustrated in FIG. 15, the determination information generation unit 212 updates the determination information corresponding to ContentA_2 from "x" to "◯". The updated determination information is made ready for delivery via the network 402.

Returning to FIG. 13, the determination information transmission unit 214 of the edge server 200a transmits the updated determination information to the client 300a in response to the request from the client 300a, for example (step S510). Subsequent steps S511 to S514 are the same as steps S505 to S508.

Figure 16:
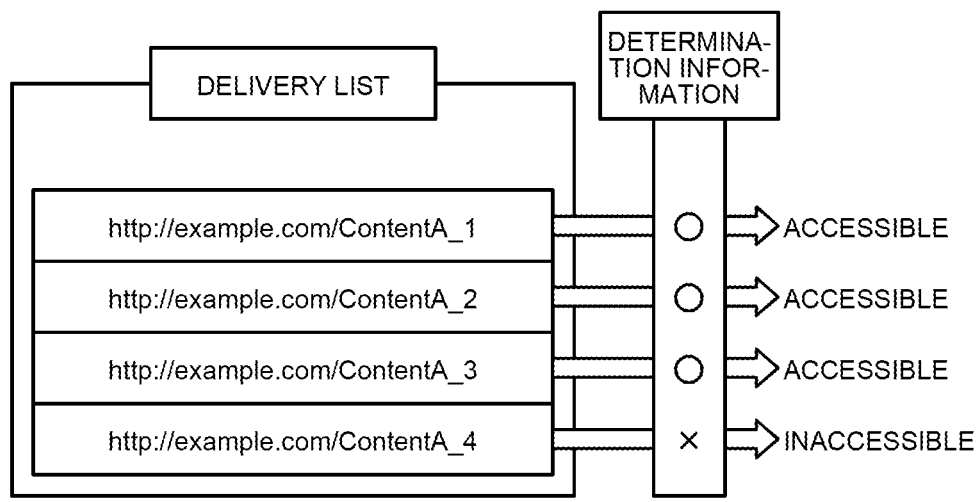
FIG. 16 is a diagram illustrating an example of updated determination information.

FIG. 16 is a diagram illustrating an example of determining the delivery list illustrated in FIG. 5 by using the determination information illustrated in FIG. 15. As illustrated in FIG. 16, the determination unit 313 can determine that ContentA_2 is in a transmittable (accessible) state.

In this way, when ContentA_2 is ready for delivery, the client 300a does not reacquire the delivery list, but can obtain the latest state of each content only by simply applying the updated determination information to the delivery list that has already been received.

Figure 17:
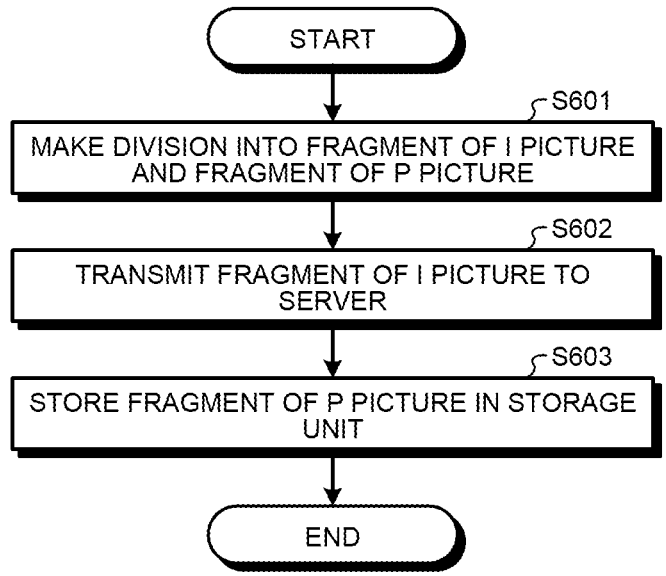
FIG. 17 is a diagram illustrating an example of determining a delivery list using the determination information.

Next, data transmission processing by the edge server 200a will be described. FIG. 17 is a flowchart illustrating an example of transmission processing by the edge server 200a.

The division unit 112 divides the data (video) stored in the storage unit 222 into data to be transmitted to the center server 200b and data stored in the storage unit 121. For example, the division unit 112 divides the input video into a fragment of an I picture and a fragment of a P picture (step S601). The data transmission unit 113 transmits the fragment of the I picture to the center server 200b (step S602). The storage control unit 114 stores the fragment of the P picture in the storage unit 121 (step S603).

The present embodiment can be applied to, for example, a system for monitoring a video captured by a drive recorder. Applicable systems are not limited thereto. For example, it may be applied to a system that delivers and monitors sensor data obtained by a sensor, and a system that delivers and monitors moving image data obtained by an imaging device mounted on a moving body or the like. The moving body includes, for example, people, robots, vehicles (automobiles, motorcycles, trains, etc.), trolleys, flyable objects (manned aerial vehicles, unmanned aerial vehicles (e.g., UAVs), drones), and personal mobility, and so on. In addition, the moving body is, for example, a moving body that travels through a driving operation by a person, and a moving body that can automatically travel (automatically drive) without a driving operation by a person.

The present embodiment can also be applied to, for example, a monitoring system that monitors an operation history of a screen (Human Machine Interface (HMI)) of a monitoring and control system of the device. The operation history of the screen can be obtained by, for example, a function of capturing and recording the screen displayed on the display device. The image data thus obtained can be used in place of the video captured by the transmitting device 100.

Since a large number of monitoring screens are usually used in the monitoring and control system of the device, it may be necessary for the monitoring system of the operation history of the screen to monitor a large number of monitoring screen images side by side. In general, the processing of displaying a large number of videos in parallel in this way increases a processing load, but in the present embodiment, since only the divided data (for example, I picture) can be displayed, the increase in the processing load can be suppressed.

In the present embodiment, the data transmitted from the transmitting device 100 is transmitted to the center server 200b via the edge server 200a. Therefore, for example, even if the power of the transmitting device 100 is turned off, or even if the transmitting device 100 is moved and goes offline, if the data has already been transmitted to the edge server 200a, the edge server 200a can transmit the data on behalf of the transmitting device 100.

For example, the transmitting device 100 and the edge server 200a may be connected by a high-speed network 401 such as a 5th generation mobile communication system (5G) or a wireless LAN, and the edge server 200a and the center server 200b may be connected by a network 403, which is slower than the network 401. With such a configuration, the data is constantly uploaded to the edge server 200a on the high-speed network 401, and it is possible to perform control such as transmitting the data from the edge server 200a to the center server 200b, for example, when a usage rate of the network 403 is low.

When applied to the system that monitors the data obtained by the moving body, a plurality of edge servers 200a may be delivered and arranged in a moving range of the moving body. For example, the plurality of edge servers 200a may be arranged in a plurality of traffic lights, a plurality of utility poles, a plurality of garages, a plurality of radio stations, and the like. In this case, the center server 200b may be, for example, a center server of the telematics service.

The configuration in which the plurality of edge servers 200a is delivered and arranged can be applied to, for example, a system for monitoring sensor data of each device included in a power plant. In such a system, for example, the edge servers 200a for collecting sensor data are delivered and arranged in each of a plurality of control rooms. The center server 200b is provided in an office, for example. A data diode may be configured to allow only one transmission from each edge server 200a to the center server 200b.

In the configuration in which the plurality of edge servers 200a is delivered and arranged, the data obtained by one transmitting device 100 can be transmitted to the center server 200b via the plurality of edge servers 200a. In the present embodiment, since each edge server 200*a* operates so as to virtualize the transmitting device 100, it seems from the center server 200*b* that data is transmitted from the one transmitting device 100. Therefore, for example, a function of synchronizing the data between each edge server 200*a* is unnecessary. In addition, the center server 200*b* does not need a function of distinguishing and processing the plurality of edge servers 200*a*, for example.

Modified Example 1

In the above embodiment, the data transmitted from the transmitting device 100 is transmitted to the center server 200*b* via the edge server 200*a*. The data may be transmitted from the transmitting device 100 to the center server 200*b* without going through the edge server 200*a*.

For example, the transmitting device 100 transmits the data to the center server 200*b* without going through the edge server 200*a* in response to a request from the center server 200*b* or a predetermined transmission condition.

For example, the center server 200*b* is connected to the transmitting device 100 so that the request and data can be directly transmitted and received. The center server 200*b* (request transmission/reception unit 215), for example, transmits the I picture directly to the center server 200*b*, and also transmits a request to transmit the P picture to the edge server 200*a* to the transmitting device 100. The transmitting device 100 transmits the I picture to the center server 200*b* and the P picture to the edge server 200*a* according to such a request.

The predetermined transmission condition is, for example, a network connection form between the edge server 200*a* and the center server 200*b*. The transmitting device 100 transmits, for example, only a portion (for example, I picture) of the divided pictures to the server connected to the relatively low-speed network, and transmits the remaining pictures (for example, P picture) to the server connected to the relatively high-speed network.

More specifically, the network connection form may be defined as follows.

(N1) Connect to the edge server 200*a* with a high-speed network 401 (5G, wireless LAN, etc.), and connect to the center server 200*b* with a network 403 slower than the network 401.

(N2) Connect to the edge server 200*a* with high-speed Long Term Evolution (LTE), and connect to the center server 200*b* with low-speed LTE.

When connecting to both the edge server 200*a* and the center server 200*b* with a 5G-compliant network, a slice defined by 5G may be the transmission condition. For example, when a slice that transmits data at a lower speed is used for communication with the center server 200*b*, the transmitting device 100 may transmit only a portion (for example, an I picture) of the divided pictures to the center server 200*b* using such a slice.

In the case of a configuration in which the data can be directly transmitted from the transmitting device 100 to the center server 200*b*, the data directly transmitted from the transmitting device 100 and the data transmitted from the transmitting device 100 via the edge server 200*a* may overlap. In the present embodiment, the edge server 200*a* transmits the data so as to virtualize the transmitting device 100. Therefore, the center server 200*b* recognizes that a situation is the same as the situation in which the overlapped data is transmitted from the transmitting device 100.

Therefore, if the center server 200*b* has a function of executing processing when the overlapped data is transmitted from the transmitting device 100, for example, it is not necessary to have a function for matching the data transmitted from the transmitting device 100 with the data transmitted from the edge server 200*a*. The function of executing the processing when the overlapped data is transmitted from the transmitting device 100 may be any function conventionally used, such as a function of discarding one of the overlapped data and a function of storing both of the overlapped data.

Figure 18:
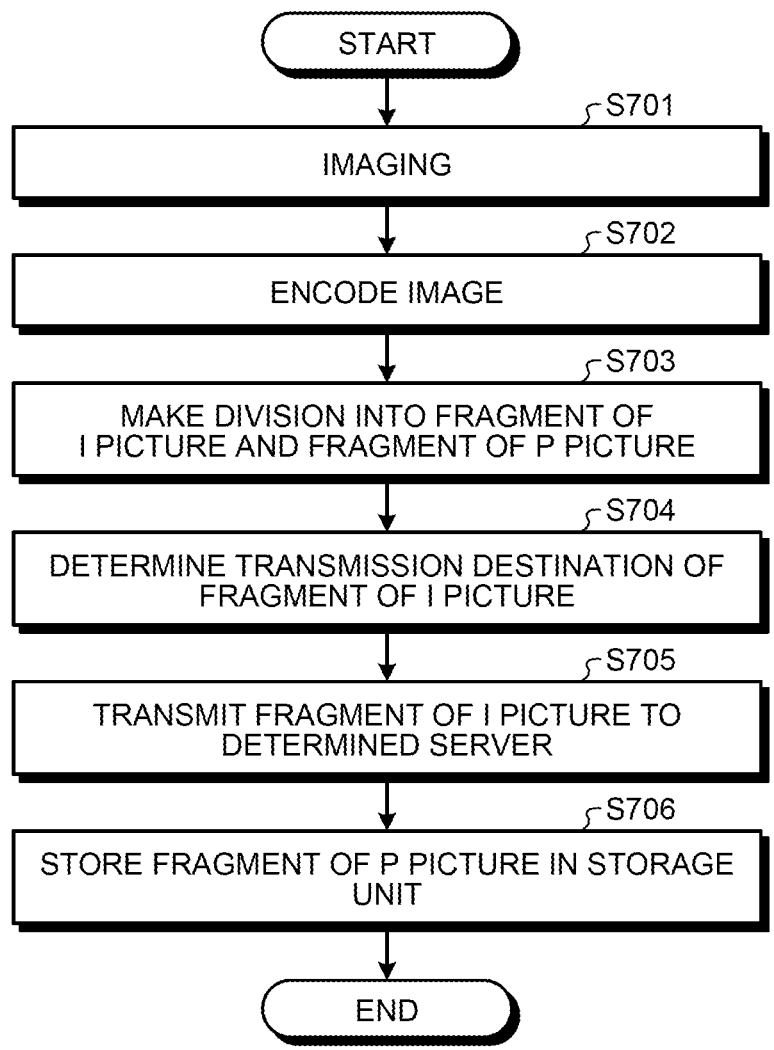
FIG. 18 is a flowchart of transmission processing according to a modified example.

FIG. 18 is a flowchart illustrating an example of transmission processing by the transmitting device 100 in the present modified example. Although FIG. 18 describes an example in which the I picture and the P picture are divided and transmitted, the data division method is not limited thereto as described above.

Steps S701 to S703 are the same as steps S101 to S103 of FIG. 9 illustrating the transmission processing by the transmitting device 100 of the above embodiment.

In the present modified example, the data transmission unit 113 determines a destination to which the fragment of the I picture is transmitted (step S704). For example, in the case where the center server 200*b* requests transmission of the I picture, the data transmission unit 113 determines that the center server 200*b* is a transmission destination. The data transmission unit 113 may determine the transmission destination according to the transmission condition, not according to the request. For example, the data transmission unit 113 may determine a server connected by a slower network as the transmission destination of the I picture.

The data transmission unit 113 transmits the fragment of the I picture to the server of the determined destination (step S705). The storage control unit 114 stores the fragment of the P picture in the storage unit 121 (step S706).

Modified Example 2

Figure 19:
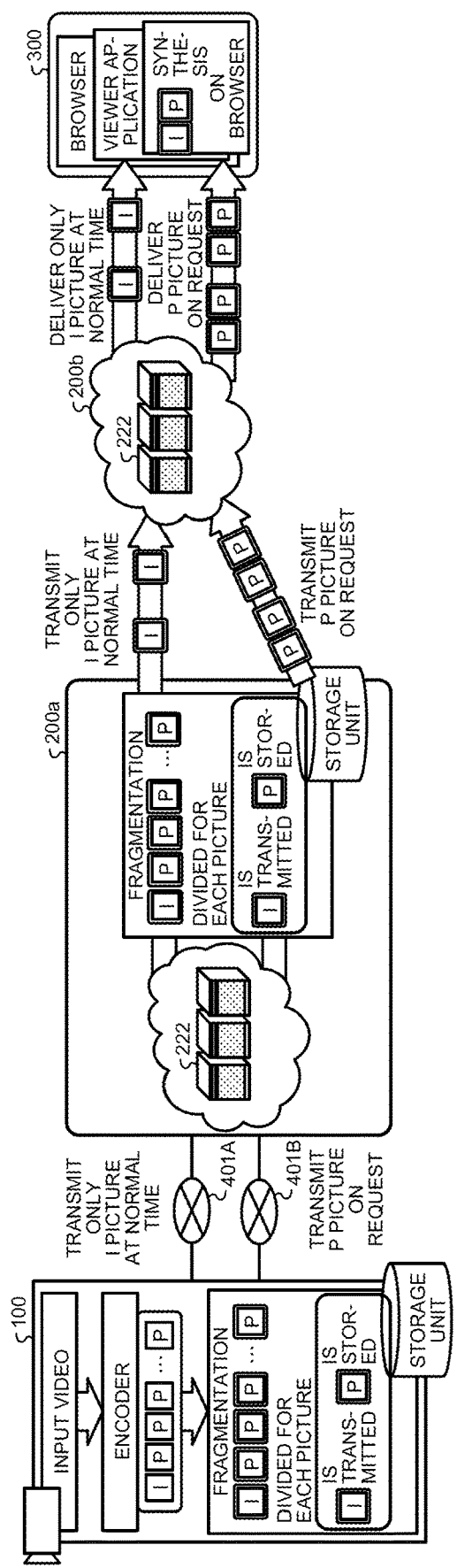
FIG. 19 is a diagram illustrating a configuration example of a video delivery system of the modified example.

The network 401 may be configured by a plurality of communication lines, and may be configured to transmit a portion (for example, I picture) of the data divided by the division unit 112 to the edge server 200*a* by one of the plurality of communication lines (communication line 401A), and transmit the remaining data (for example, P picture) to the edge server 200*a* by the other communication line (communication line 401B) among the plurality of communication lines. FIG. 19 is a diagram illustrating a configuration example of a video delivery system of the modified example 2 configured in this way. For example, the data transmission unit 113 may live-stream the I picture by the communication line 401A and transmit the P picture by the communication line 401B at any timing.

The network 403 between the edge server 200*a* and the center server 200*b* may be configured by the plurality of communication lines by the same method as the network 401.

Modified Example 3

Instead of transmitting the divided data to the edge server 200*a*, the divided data may be divided and stored in the storage unit 121 in the transmitting device 100. As a result, for example, it is possible to read and display only a necessary picture (for example, an I picture) from the storage unit 121. The method of displaying only the I picture can reduce the processing load as compared with the method of displaying all the pictures including the P picture. Therefore, for example, even for the client 300*a* or the like whose processing capacity is limited, it is possible to read only the I pictures from the storage units 121 of a plurality of transmitting devices 100 and display them in parallel. Further, if necessary, the remaining P pictures and the like can be read step by step to make a moving display.

In this case, the storage control unit 114 may delete the data for which a certain period of time has passed since it was stored, as in the case of the storage control unit 218 of the edge server 200a, and may delete the data step by step after a certain period of time has elapsed. For example, when the storage capacity is insufficient, it is possible to delete only the P picture and leave the I picture as data that can be displayed intermittently, instead of deleting all the data including the I picture and the P picture in chronological order, and therefore, both long-term storage of data and low capacity can be achieved.

Modified Example 4

If the video is divided and delivered for each picture, a size of the delivery list may increase. Therefore, the list generation unit 211 may create a delivery list from a plurality of files having a hierarchical structure. For example, the list generation unit 211 may configure the delivery list hierarchically in units of year, month, day, time, and the like. For example, the delivery list at the bottom layer includes identification information of each piece of fragment data divided into a certain range of time. The next top delivery list includes information that identifies one or more delivery lists that correspond to the time included in a day. The next top delivery list includes information that identifies one or more delivery lists that correspond to the days included in a month. The next top delivery list includes information that identifies one or more delivery lists that correspond to the months included in a year.

Modified Example 5

Figure 20:
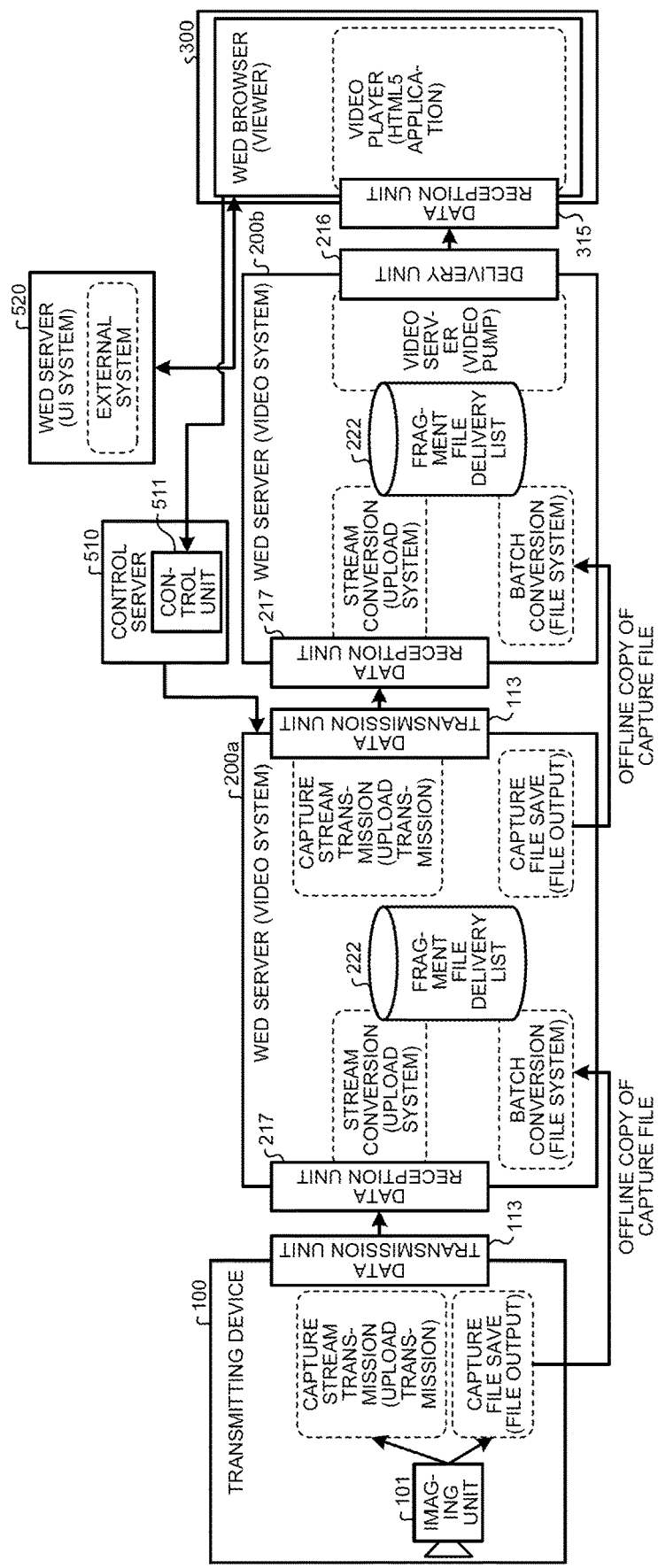
FIG. 20 is a diagram illustrating an outline of delivery processing by the video delivery system of the modified example.

FIG. 20 is a diagram illustrating an outline of delivery processing by a video delivery system of the modified example 5. The video delivery system of the present modified example further includes a control server 510 and a Web server 520. In the present modified example, the center server 200b is configured as a Web server that delivers video.

The control server 510 includes a control unit 511. The control unit 511 controls the edge server 200a according to the request transmitted from the client 300b. For example, the client 300b transmits a transmission request to the control server 510 indicating whether to divide the picture and transmit only a portion (for example, only the I picture) or all the pictures. The control unit 511 of the control server 510 transmits, according to the transmission request, a control signal indicating whether to divide only a portion of the pictures and transmit (upload) them to the center server 200b, or transmit all the pictures to the center server 200b, to the edge server 200a.

The edge server 200a operates by switching between transmitting only a portion of the pictures divided as in the above embodiment to the center server 200b, or transmitting all the pictures to the center server 200b, according to the control signal transmitted from the control server 510.

The capture stream transmission (upload transmission) means that the divided data is transmitted as the data (first data) to be transmitted to the edge server 200a or the center server 200b. The capture file save (file output) means that the divided data is stored as the data (second data) to be stored in the storage unit 121 without being transmitted to the edge server 200a or the center server 200b. As illustrated in FIG. 20, the stored data may be copied offline to the edge server 200a and the center server 200b.

The edge server 200a and the center server 200b convert the data received by the data reception unit 217 into a deliverable format (stream conversion) and store it in the storage unit 222, if necessary. The data copied offline may be collectively converted (batch conversion) and stored in the storage unit 222.

The storage unit 222 stores each picture (fragment file) in a deliverable format, a delivery list, and the like. The center server 200b functions as a video server that delivers the pictures stored in the storage unit 222. As described above, the data received by the data reception unit 217 may be stored in the temporary storage unit 221 and the data stored in the temporary storage unit 221 may be delivered by the delivery unit 216.

The client 300b has a web browser with a viewer. The web browser has a video player that reproduces a video. The video player is realized as, for example, an HTML5-compliant application.

The Web server 520 is a server device having a function other than the function of the video server. For example, the Web server 520 is a server device for providing a user interface (UI) for an external system different from the video delivery system.

As described above, the video delivery system of the above embodiment can be realized as a Web system used on the Internet, for example.

Figure 21:
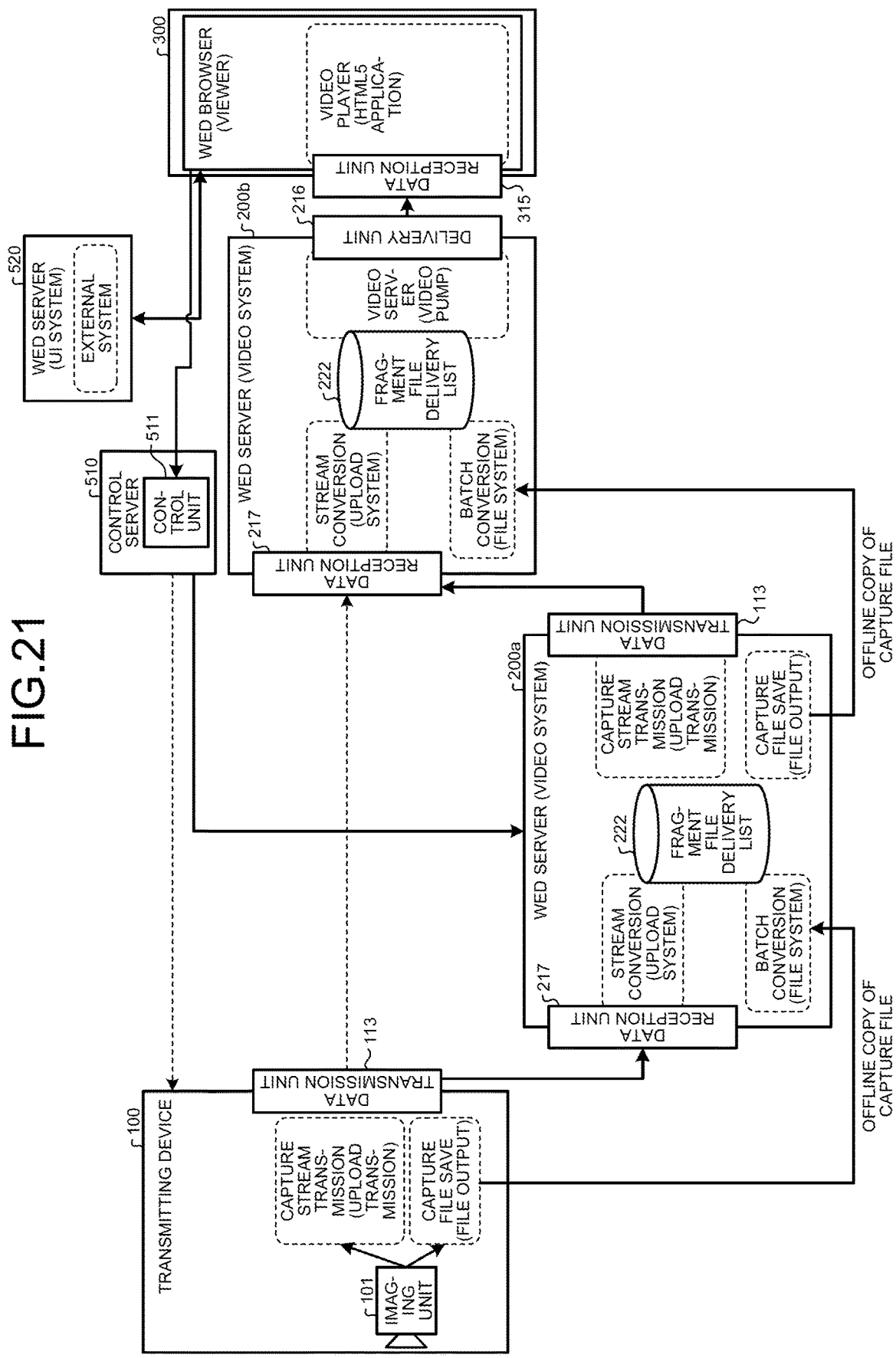
FIG. 21 is a diagram illustrating an outline of delivery processing by the video delivery system of the modified example.

FIG. 21 is a diagram illustrating another example of the video delivery system of the modified example 5. FIG. 21 is an example of a video delivery system configured so that data can be transmitted from the transmitting device 100 to the center server 200b without going through the edge server 200a as in the modified example 1.

In such a configuration, as illustrated in FIG. 21, the control server 510 can transmit the control signal not only to the edge server 200a but also to the transmitting device 100. In addition, the data transmission unit 113 of the transmitting device 100 can directly transmit data not only to the edge server 200a but also to the center server 200b.

As described above, in the video delivery system according to the present embodiment, it is possible to reduce the line load and the processing load without deteriorating the quality.

Figure 22:
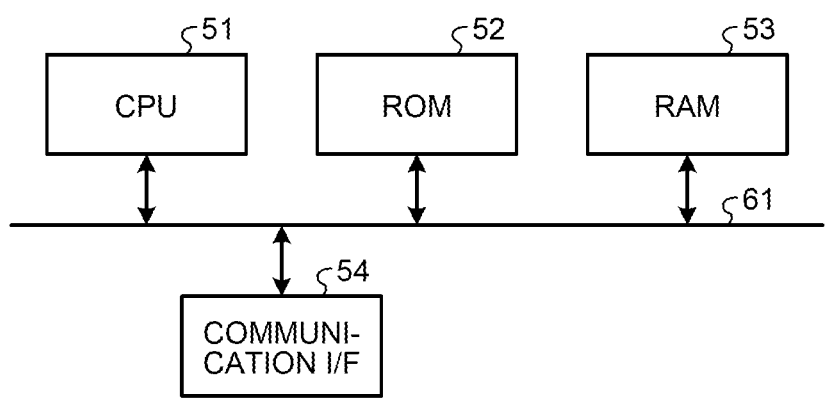
FIG. 22 is a hardware configuration diagram of a transmitting device according to the present embodiment.

Next, a hardware configuration of the transmitting device according to the present embodiment will be described with reference to FIG. 22. FIG. 22 is an explanatory diagram illustrating a hardware configuration example of the transmitting device according to the present embodiment.

The transmitting device according to the present embodiment is a control device such as a CPU 51, a storage device such as a Read Only Memory (ROM) 52 or a RAM 53, a communication I/F 54 that connects to a network for communication, and a bus 61 that connects each unit.

A program executed by the transmitting device according to the present embodiment is provided by being incorporated in the ROM 52 or the like in advance.

The program executed by the transmitting device according to the present embodiment may be configured to be recorded on a computer-readable recording medium such as Compact Disk Read Only Memory (CD-ROM), flexible disks (FD), Compact Disk Recordable (CD-R), and Digital Versatile Disk (DVD) in a file in an installable format or an executable format and provided as a computer program product.

Further, the program executed by the transmitting device according to the present embodiment may be stored on a computer connected to a network such as the Internet and provided by downloading via the network. In addition, the program executed by the transmitting device according to the present embodiment may be configured to be provided or delivered via a network such as the Internet.

The program executed by the transmitting device according to the present embodiment can make the computer function as each unit of the transmitting device described above. Such a computer can read and execute a program on a main storage device from a computer-readable storage medium by the CPU 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A communication system comprising:
a first server device; and
a second server device, wherein
the second server device includes:
one or more processors configured to:
receive a plurality of transmission data from a transmitting device, the transmitting device dividing a plurality of data to be transmitted to the second server device into a plurality of divided data, and the transmitting device transmitting the plurality of transmission data including the plurality of divided data;
divide the plurality of transmission data into first data and second data, the first data being a portion of the plurality of transmission data and the second data being an other portion of the plurality of transmission data;
transmit the first data to the first server device that delivers transmission data to a receiving device;
store, in a storage, the second data and metadata indicating that the second data is not transmitted to the first server device;
receive a transmission request for the second data from the receiving device or the first server device;
transmit the second data to the first server device in response to the transmission request,
determine whether the second data is delivered to the receiving device by using the metadata; and
perform deleting by prioritizing all or part of the second data delivered to the receiving device.

2. The communication system according to claim 1, wherein
the plurality of transmission data is moving image data, and
the first data includes image data encoded by intra-frame prediction.

3. The communication system according to claim 2, wherein the second data includes image data encoded by inter-frame prediction based on the first data.

4. The communication system according to claim 2, wherein the first data includes a portion of image data encoded by the intra-frame prediction, and
the second data includes image data other than image data included in the first data among the image data encoded by the intra-frame prediction, and image data encoded by inter-frame prediction based on the first data.

5. The communication system according to claim 2, wherein
the first data includes a portion of the image data encoded by the intra-frame prediction, and
the one or more processors change the image data included in the first data among the image data encoded by the intra-frame prediction, according to a band of a network that transmits the plurality of transmission data.

6. The communication system according to claim 2, wherein
the first data includes a portion of image data encoded by the intra-frame prediction, and
the one or more processors change the image data included in the first data among the image data encoded by the intra-frame prediction, in response to a request from the receiving device or the first server device.

7. The communication system according to claim 1, wherein the one or more processors change a size of the first data according to a band of a network that transmits the plurality of transmission data.

8. The communication system according to claim 1, wherein the one or more processors delete the second data stored in the storage according to a predetermined condition.

9. The communication system according to claim 1, further comprising:
the transmitting device.

10. A computer program product comprising a non-transitory computer-readable medium including programmed instructions, the instructions causing a computer included in a server device to execute:
receiving a plurality of transmission data from a transmitting device;
dividing the plurality of transmission data into first data and second data, the first data being a portion of the plurality of transmission data and the second data being an other portion of the plurality of transmission data;
transmitting the first data to an external server device that delivers transmission data to a receiving device;
storing, in a storage, the second data and metadata indicating that the second data is not transmitted to the external server device;
receiving a transmission request for the second data from the receiving device or the external server device;
transmitting the second data to the external server device in response to the transmission request;
determining whether the second data is delivered to the receiving device by using the metadata; and
performing deleting by prioritizing all or part of the second data delivered to the receiving device.

11. A server device comprising:
one or more processors configured to:
receive a plurality of transmission data from a transmitting device;
divide the plurality of transmission data into first data and second data, the first data being a portion of the plurality of transmission data and the second data being an other portion of the plurality of transmission data;
transmit the first data to an external server device that delivers transmission data to a receiving device;

store, in a storage, the second data and metadata indicating that the second data is not transmitted to the external server device;

receive a transmission request for the second data from the receiving device or the external server device;

transmit the second data to the external server device in response to the transmission request;

determine whether the second data is delivered to the receiving device by using the metadata; and perform deleting by prioritizing all or part of the second data delivered to the receiving device.

12. The device according to claim 11, wherein the metadata is not transmitted to the receiving device.

* * * * *